(12) United States Patent
Halepete et al.

(10) Patent No.: US 7,596,708 B1
(45) Date of Patent: *Sep. 29, 2009

(54) ADAPTIVE POWER CONTROL (76) Inventors: Sameer Halepete, 373 Riveroaks Cir., #1608, San Jose, CA (US) 95134; H. Peter Anvin, 4390 Albany Dr. #46, San Jose, CA (US) 95129; Zongjian Chen, 719 Rosewood Dr., Palo Alto, CA (US) 94303; Godfrey P. D'Souza, 298 S. 12th St., San Jose, CA (US) 95112; Marc Fleischmann, 445 Oak Grove Ave., #8, Menlo Park, CA (US) 94025; Keith Klayman, 613 San Conrado Ter. #2, Sunnyvale, CA (US) 94086; Thomas Lawrence, 2330 Heather Ct., Mountain View, CA (US) 94043; Andrew Read, 1621 Eagle Dr., Sunnyvale, CA (US) 94087

( * ) Notice: Subject to any disclaimer, the term of this patent is extended or adjusted under 35 U.S.C. 154(b) by 0 days.

This patent is subject to a terminal disclaimer.

(21) Appl. No.: 11/411,309

(22) Filed: Apr. 25, 2006

Related U.S. Application Data (63) Continuation of application No. 09/484,516, filed on Jan. 18, 2000, now Pat. No. 7,100,061.

(51) Int. Cl.
    *G06F 1/30* (2006.01)
(52) U.S. Cl. .................................................. 713/322
(58) Field of Classification Search .......... 713/300–340
    See application file for complete search history.

(56) References Cited

U.S. PATENT DOCUMENTS

| 4,137,563 | A | 1/1979 | Tsunoda |
| 4,238,784 | A | 12/1980 | Keen et al. |
| 4,694,393 | A | 9/1987 | Hirano |
| 4,698,748 | A | 10/1987 | Juzswik |
| 4,841,440 | A | 6/1989 | Yonezu |
| 4,893,271 | A | 1/1990 | Davis |
| 5,021,679 | A | 6/1991 | Fairbanks et al. |
| 5,025,387 | A | 6/1991 | Frane |
| 5,086,387 | A | 2/1992 | Arroyo |
| 5,086,501 | A | 2/1992 | DeLuca et al. ............. 395/550 |
| 5,153,535 | A | 10/1992 | Fairbanks et al. |

(Continued)

FOREIGN PATENT DOCUMENTS

EP    0381021 A2    8/1990

(Continued)

OTHER PUBLICATIONS

Intel Corporation; "Intel 82801 Cam I/O Controller Hub (ICH3-M)" Datasheet; Jul. 2001.

(Continued)

*Primary Examiner*—Paul R Myers (57) ABSTRACT

A method for controlling the power used by a computer including the steps of measuring the operating characteristics of a central processor of the computer, determining when the operating characteristics of the central processor are significantly different than required by the operations being conducted, and changing the operating characteristics of the central processor to a level commensurate with the operations being conducted.

62 Claims, 4 Drawing Sheets

U.S. PATENT DOCUMENTS

| | | |
|---|---|---|
| 5,167,024 A | 11/1992 | Smith et al. ............... 395/375 |
| 5,189,314 A | 2/1993 | Georgiou et al. |
| 5,201,059 A | 4/1993 | Nguyen ...................... 395/800 |
| 5,204,863 A | 4/1993 | Saint-Joigny et al. ...... 371/16.3 |
| 5,218,704 A | 6/1993 | Watts, Jr. et al. ............ 395/750 |
| 5,220,672 A | 6/1993 | Nakao |
| 5,222,239 A | 6/1993 | Rosch ....................... 395/750 |
| 5,230,055 A | 7/1993 | Katz et al. ................. 395/750 |
| 5,239,652 A | 8/1993 | Seibert et al. ............... 395/750 |
| 5,274,798 A | 12/1993 | Aihara |
| 5,388,265 A | 2/1995 | Volk |
| 5,390,350 A | 2/1995 | Chung |
| 5,406,212 A | 4/1995 | Hashinaga et al. |
| 5,410,711 A | 4/1995 | Stewart |
| 5,422,806 A | 6/1995 | Chen et al. .................. 364/149 |
| 5,423,045 A | 6/1995 | Kannan |
| 5,428,790 A | 6/1995 | Harper |
| 5,440,520 A | 8/1995 | Schutz et al. |
| 5,452,434 A | 9/1995 | MacDonald |
| 5,461,266 A | 10/1995 | Koreeda et al. ............. 307/125 |
| 5,461,652 A | 10/1995 | Hongo |
| 5,479,648 A | 12/1995 | Barbera |
| 5,481,697 A | 1/1996 | Mathews |
| 5,490,059 A | 2/1996 | Mahalingaiah et al. |
| 5,502,838 A | 3/1996 | Kikinis ....................... 395/550 |
| 5,504,910 A | 4/1996 | Wisor et al. |
| 5,511,203 A | 4/1996 | Wisor et al. ................. 395/750 |
| 5,553,236 A | 9/1996 | Revilla |
| 5,555,225 A | 9/1996 | Hayashi |
| 5,560,020 A | 9/1996 | Nakatani et al. ............ 395/750 |
| 5,560,024 A | 9/1996 | Harper |
| 5,572,719 A | 11/1996 | Biesterfeldt |
| 5,590,342 A | 12/1996 | Marisetty |
| 5,592,173 A | 1/1997 | Lau et al. .................... 342/357 |
| 5,600,839 A | 2/1997 | MacDonald |
| 5,623,677 A | 4/1997 | Townsley |
| 5,628,001 A | 5/1997 | Cepuran |
| 5,628,020 A | 5/1997 | O'Brien |
| 5,630,110 A | 5/1997 | Mote, Jr. |
| 5,630,146 A | 5/1997 | Conary |
| 5,638,083 A | 6/1997 | Margeson |
| 5,659,789 A | 8/1997 | Hausauer |
| 5,675,808 A | 10/1997 | Gulick |
| 5,677,849 A | 10/1997 | Smith |
| 5,682,093 A | 10/1997 | Kivela ........................ 323/273 |
| 5,687,114 A | 11/1997 | Khan |
| 5,692,201 A | 11/1997 | Yato |
| 5,692,204 A | 11/1997 | Rawson et al. ............. 395/750 |
| 5,710,911 A | 1/1998 | Walsh |
| 5,710,929 A | 1/1998 | Fung |
| 5,713,030 A | 1/1998 | Evoy |
| 5,715,467 A | 2/1998 | Jirgal |
| 5,717,319 A | 2/1998 | Jokinen ...................... 323/280 |
| 5,719,800 A | 2/1998 | Mittal et al. ................. 364/707 |
| 5,721,837 A | 2/1998 | Kikinis |
| 5,726,901 A | 3/1998 | Brown ........................ 364/483 |
| 5,727,208 A | 3/1998 | Brown |
| 5,734,877 A | 3/1998 | Ries |
| 5,737,613 A | 4/1998 | Mensch |
| 5,745,375 A | 4/1998 | Reinhardt et al. |
| 5,745,774 A | 4/1998 | Munetsugu |
| 5,752,011 A | 5/1998 | Thomas et al. ............. 395/556 |
| 5,754,436 A | 5/1998 | Walsh |
| 5,754,833 A | 5/1998 | Singh et al. |
| 5,754,837 A | 5/1998 | Walsh |
| 5,754,867 A | 5/1998 | Walker |
| 5,754,869 A | 5/1998 | Holzhammer et al. .. 395/750.01 |
| 5,754,883 A | 5/1998 | Lim |
| 5,757,171 A | 5/1998 | Babcock ..................... 323/271 |
| 5,760,636 A | 6/1998 | Noble et al. |
| 5,774,703 A | 6/1998 | Weiss et al. |
| 5,778,237 A | 7/1998 | Yamamoto et al. ...... 395/750.04 |
| 5,778,239 A | 7/1998 | Yamamoto et al. |
| 5,781,060 A | 7/1998 | Sugawara |
| 5,781,780 A | 7/1998 | Walsh |
| 5,781,783 A | 7/1998 | Gunther et al. |
| 5,787,294 A | 7/1998 | Evoy |
| 5,794,022 A | 8/1998 | Karouji |
| 5,798,667 A | 8/1998 | Herbert |
| 5,799,198 A | 8/1998 | Fung |
| 5,805,909 A | 9/1998 | Diewald |
| 5,812,860 A | 9/1998 | Horden et al. ........... 395/750.04 |
| 5,815,724 A | 9/1998 | Mates .................... 395/750.04 |
| 5,815,725 A | 9/1998 | Feierbach |
| 5,825,674 A | 10/1998 | Jackson ..................... 364/707 |
| 5,832,205 A | 11/1998 | Kelly et al. |
| 5,832,284 A | 11/1998 | Michail et al. |
| 5,842,029 A | 11/1998 | Conary |
| 5,848,281 A | 12/1998 | Smalley et al. .......... 395/750.04 |
| 5,884,049 A | 3/1999 | Atkinson .................... 395/281 |
| 5,884,068 A | 3/1999 | Conary et al. |
| 5,892,959 A | 4/1999 | Fung |
| 5,894,577 A | 4/1999 | MacDonald et al. ........ 395/733 |
| 5,898,879 A | 4/1999 | Kim |
| 5,905,914 A | 5/1999 | Sakai |
| 5,907,699 A | 5/1999 | Nakajima |
| 5,909,585 A | 6/1999 | Shinmiya |
| 5,913,067 A | 6/1999 | Klein |
| 5,914,996 A | 6/1999 | Huang |
| 5,919,262 A | 7/1999 | Kikinis et al. ............... 713/300 |
| 5,923,545 A | 7/1999 | Nguyen ...................... 363/24 |
| 5,926,394 A | 7/1999 | Nguyen et al. |
| 5,931,951 A | 8/1999 | Ando |
| 5,933,649 A | 8/1999 | Lim et al. ............... 395/750.04 |
| 5,935,253 A | 8/1999 | Conary |
| 5,940,785 A | 8/1999 | Georgiou et al. ............ 702/132 |
| 5,940,786 A | 8/1999 | Steeby ....................... 702/132 |
| 5,974,557 A | 10/1999 | Thomas et al. ............. 713/322 |
| 5,978,864 A | 11/1999 | Hetherington |
| 5,996,083 A | 11/1999 | Gupta et al. ................ 713/322 |
| 5,996,084 A | 11/1999 | Watts ......................... 713/323 |
| 6,000,035 A | 12/1999 | Matsushima |
| 6,006,169 A | 12/1999 | Sandhu et al. |
| 6,016,548 A | 1/2000 | Nakamura |
| 6,021,500 A | 2/2000 | Wang et al. |
| 6,035,407 A | 3/2000 | Gebara et al. |
| 6,047,248 A | 4/2000 | Georgiou et al. ............ 702/132 |
| 6,048,746 A | 4/2000 | Burr |
| 6,078,319 A | 6/2000 | Bril et al. .................... 345/211 |
| 6,087,892 A | 7/2000 | Burr |
| 6,091,283 A | 7/2000 | Murgula et al. |
| 6,094,367 A | 7/2000 | Hsu et al. |
| 6,100,751 A | 8/2000 | De et al. |
| 6,112,164 A | 8/2000 | Hobson |
| 6,118,306 A | 9/2000 | Orton et al. .................. 327/44 |
| 6,119,241 A | 9/2000 | Michail et al. .............. 713/322 |
| 6,141,762 A | 10/2000 | Nicol et al. ................. 713/300 |
| 6,157,092 A | 12/2000 | Hofmann .................... 307/11 |
| 6,158,012 A | 12/2000 | Watts, Jr. |
| 6,163,583 A | 12/2000 | Lin |
| 6,192,479 B1 | 2/2001 | Ko |
| 6,202,104 B1 | 3/2001 | Ober ........................... 710/18 |
| 6,216,234 B1 | 4/2001 | Sager et al. |
| 6,216,235 B1 | 4/2001 | Thomas et al. ............. 713/501 |
| 6,218,708 B1 | 4/2001 | Burr |
| 6,272,642 B2 | 8/2001 | Pole, III et al. ............. 713/300 |
| 6,279,048 B1 | 8/2001 | Fadavi-Ardekani et al. ... 710/15 |
| 6,303,444 B1 | 10/2001 | Burr |
| 6,304,824 B1 | 10/2001 | Bausch et al. ................ 702/64 |
| 6,311,281 B1 | 10/2001 | Pole et al. |
| 6,311,287 B1 | 10/2001 | Dischler et al. ............. 713/601 |
| 6,314,522 B1 | 11/2001 | Chu et al. ................... 713/322 |
| 6,320,453 B1 | 11/2001 | Manning |
| 6,345,362 B1 | 2/2002 | Bertin et al. |

| | | | |
|---|---|---|---|
| 6,345,363 B1 | 2/2002 | Levy-Kendler | 713/320 |
| 6,347,379 B1 | 2/2002 | Dai et al. | 713/320 |
| 6,363,490 B1 | 3/2002 | Senyk | |
| 6,378,081 B1 | 4/2002 | Hammond | 713/501 |
| 6,388,432 B2 | 5/2002 | Uchida | 323/266 |
| 6,415,388 B1 | 7/2002 | Browning et al. | 713/322 |
| 6,425,086 B1 | 7/2002 | Clark et al. | 713/322 |
| 6,427,211 B2 | 7/2002 | Watts, Jr. | 713/320 |
| 6,442,746 B1 | 8/2002 | James et al. | 716/14 |
| 6,457,135 B1 | 9/2002 | Cooper | 713/322 |
| 6,477,654 B1 | 11/2002 | Dean et al. | 713/300 |
| 6,477,657 B1 | 11/2002 | Kurd et al. | |
| 6,484,041 B1 | 11/2002 | Aho et al. | |
| 6,487,668 B2 | 11/2002 | Thomas et al. | 713/322 |
| 6,489,224 B1 | 12/2002 | Burr | |
| 6,510,400 B1 | 1/2003 | Moriyama | 702/132 |
| 6,510,525 B1 | 1/2003 | Nookala et al. | 713/324 |
| 6,513,124 B1 | 1/2003 | Furuichi et al. | 713/322 |
| 6,519,706 B1 | 2/2003 | Ogoro | 713/322 |
| 6,574,577 B2 | 6/2003 | Stapleton et al. | |
| 6,574,739 B1 | 6/2003 | Kung et al. | 713/322 |
| 6,647,502 B1 | 11/2003 | Ohmori | |
| 6,675,360 B1 | 1/2004 | Cantone et al. | |
| 6,731,221 B1 | 5/2004 | Dioshongh et al. | |
| 6,792,379 B2 | 9/2004 | Ando | |
| 6,847,668 B2 | 1/2005 | Kimura | |
| 6,928,559 B1 | 8/2005 | Beard | |
| 7,100,061 B2 * | 8/2006 | Halepete et al. | 713/322 |
| 2002/0026597 A1 | 2/2002 | Dai et al. | 713/322 |
| 2002/0073348 A1 | 6/2002 | Tani | 713/300 |
| 2002/0083356 A1 | 6/2002 | Dai | 713/322 |
| 2002/0087219 A1 | 7/2002 | Dai | |
| 2002/0087896 A1 | 7/2002 | Cline et al. | |
| 2002/0116650 A1 | 8/2002 | Halepete et al. | |
| 2002/0138778 A1 | 9/2002 | Cole et al. | 713/330 |
| 2002/0194509 A1 | 12/2002 | Plante et al. | |
| 2003/0036876 A1 | 2/2003 | Fuller et al. | |
| 2003/0065960 A1 | 4/2003 | Rusu et al. | 713/300 |
| 2003/0074591 A1 | 4/2003 | McClendon et al. | 713/322 |
| 2004/0025061 A1 | 2/2004 | Lawrence | |
| 2004/0073821 A1 | 4/2004 | Naveh et al. | |
| 2004/0103330 A1 | 5/2004 | Bonnett | |

FOREIGN PATENT DOCUMENTS

| | | |
|---|---|---|
| EP | 0501655 A2 | 2/1992 |
| EP | 0474963 A2 | 3/1992 |
| EP | 0568237 A | 11/1993 |
| EP | 0 632 360 A1 | 1/1995 |
| EP | 0699992 | 3/1996 |
| EP | 0978781 | 2/2000 |
| JP | 63-180118 | 7/1988 |
| JP | 64-023317 | 1/1989 |
| JP | 64-59518 | 3/1989 |
| JP | 02-083720 | 3/1990 |
| JP | H2-83720 | 3/1990 |
| JP | 02-105213 | 4/1990 |
| JP | H2-105213 | 4/1990 |
| JP | 2183321 | 7/1990 |
| JP | 4139512 | 5/1992 |
| JP | 5224773 | 9/1993 |
| JP | 6102959 | 4/1994 |
| JP | 409185589 A | 7/1997 |
| JP | 10-187300 | 7/1998 |
| WO | WO/1993/006545 A1 | 4/1993 |
| WO | WO/1998/006022 | 2/1998 |
| WO | WO0127728 | 4/2001 |

OTHER PUBLICATIONS

"High Speed, Digitally Adjusted Step Down Controllers for Notebook CPUS"; Maxim Manual; pp. 11 & 21.

"Operation U (Refer to Functional Diagram)"; LTC 1736; Linear Technology Manual; p. 9.

Weiser et al.; "Scheduling for Reduced CPU Energy"; Xerox PARC; Palo Alto, CA; Appears in "Proceedings of the First Symposium on Operating Systems Design and Implementation" USENIX Association; Nov. 1994.

Govil; "Comparing Algorithms for Dynamic Speed-Setting of a Low-Power PCU"; International Computer Science Institute; Berkeley, CA; Apr. 1995.

Desai et al.; "Sizing of Clock Distribution Networks for High Performance CPU Chips"; Digital Equipment Corp., Hudson, MA; pp. 389-394 1996.

Andrew S. Tanenbaum, Structured Computer Organization, 1990, Prentice-Hall, Third edition, pp. 11-13.

Baker K. et al., "SHMOO Plotting: The Black Art of IC testing" IEEE Design & Test of Computer, IEEE vol. 14, No. 3, Jul. 1, 1997, pp. 90-97, XP000793305 ISSN: 070-7475 the whole document.

"Computer software", Wikipedia, http://en.wikipedia.org/wiki/Software, retrieved on May 2, 2007.

"Decision Granting Inter Partes Reexamination", United States Patent and Trademark Office, Jun. 26, 2007.

"Request for Inter Partes Reexamination Under 35 U.S.C. 311-318", Haynes and Boone LLP. unknown date.

"Wafer Burn-In Isolation Circuit" IBM Technical Disclosure Bulletin, IBM Corp. New York, US, vol. 32, No. 6B, Nov. 1, 1989, pp. 442-443, XP00073858 ISSN: 0018-8689 the whole document.

Hong, I. et al.; Synthesis Techniques For Low-Power Hard Real-Time Systems on Variable Voltage Processors; Dec. 1998; Real-Time System Symposium Proceedings.

Hong, I. et al; Power Optimization Of Variable Voltage Core-Based Systems; Jun. 1998; Design Automation Conference Proceedings.

Inter Partes Reexamination Request Filed Mar. 19, 2007; Control.: 95/000,243; For US Patent 7,100,061.

Weiser; Some Computer Science Issues In Ubiquitous Computing; Jul. 1993; Communications of the ACM, vol. 36, pp. 75-84.

Burd, et al.; Processor Design For Portable Systems; 1996; Dept. of EECS, Univ. of Berkeley.

Chandrakasan, et al.; Low-Power CMOS Digital Design; Apr. 1992; IEEE Journal of Solid-State Circuits, vol. 27, No. 4.

Govil, et al.; Comparing Algorithm For Dynamic Speed-Setting Of A Lowpower; Apr. 1995; Dept. of EECS, Univ. of Berkeley.

Leibson; Xscale (Strongarm-2) Muscles In; Sep. 11, 2000; Microdesign Resources, Microprocessor Report.

Pollack; New Microarchitecture Challenges in the coming generations of CMOS process technologies; 32$^{nd}$ Annual International Symposium on Microsrchitecture, Nov. 16-18, 1999; Haifa, Israel (includes Abstract, Speaker's Biography, and Presentation).

Cao et al. "Transient Thermal Management in Electronic Packaging using Dynamic Control of Power Dissipation and Heat Transfer," IEEE Elect. Components & Tech. Conference (1996), pp. 205-211.

G2 Computer Intelligence, "Bad Chips Cause Transmeta Recall (defective CPUs in Japanese notebook computers from NEC) (Product Information)," Client server News, (Dec. 14, 2000).

Krazit, Tom, "Transmeta Hype Suffers Hardware Reality," PC World (Sep. 6, 2004).

Mainelli, Tom, "Where's Transmeta?, " PCWorld.com (Oct. 12, 2001).

Witheiler, Matthew, "Intel Centrino/Pentium-M Notebook Roundup: Dell, FIC and IBM Examined," www.anandtech.com (Mar. 12, 2003).

Stratakos, "High-Efficiency Low-Voltage DC-DC Conversion For Portable Applications, "Fall 1998, Univ. of Cal., Berkeley, Ph.D. Dissertaion.

Pering, "The Simulation and Evaluation of Dynamic Voltage Scaling Algorithms," International Symposium on Low Power Electronics and Design, Aug. 1998, pp. 76-81, Monterey, California.

Pering, "Dynamic Voltage Scaling and the Design of a Low-Power Microprocessor System," Proceedings of the Power Driven Microarchitecture Workshop, In Conjunction with International Symposium on Computer Architecture, Jun. 1998.

Reply to Office Action in Inter partes Reexaination Filed on Aug. 27, 2007; Control No. 95/000,243; For US Patent 7,100,061.

Comments by Third Party Requester Pursuant to 37 C.F.R. §1.947 Filed on Sep. 26, 2007; Control No. 95/000,243; For US Patent 7,100,061.

Trevor Pering, Tom Burd, and Robert Brodersen. Article entitled: "The Simulation And Evaluation Of Dynamic Voltage Scaling Algorithms" University of Berkeley Electronics Research Laboratory, pp. 76-81. 1998.

Thomas D. Burd, Trevor Pering, Anthony Stratakos, and Robert W. Brodersen, "A Dynamic Voltage Scaled Microprocessor System" Berkeley Wireless Research Center, University of California, Berkeley. ISSCC 2000-Paper 17.4. 2000 IEEE. 22 Pages.

Decision Sua Sponte Vacating Inter Partes Reexamination Filing Date for U.S. Appl. No. 95/000,243 for U.S. Patent No. 7,100,061, Mail Date May 23, 2007.

Response to Decision Sua Sponte Vacating Inter Partes Reexamination Filing Date for U.S. Appl. No. 95/000,243 for U.S. Patent No. 7,100,061, Mail Date May 30, 2007.

Request for Inter Partes Reexamination Under 35 U.S.C. H311-318 for U.S. Patent No. 7,100,061, Mail Date May 30, 2007.

Response to Decision Sua Sponte Vacating Inter Partes Reexamination Filing Date for U.S. Appl. No. 95/000,243 for U.S. Patent No. 7,100,061, Mail Date Jun. 13, 2007.

Request for Inter Partes Reexamination Under 35 U.S.C. §§311-318 for U.S. Patent No. 7,100,061, Mail Date Jun. 13, 2007.

Inter Partes Reexamination Communication for U.S. Appl. No. 95/000,243 for U.S. Patent No. 7,100,061, Mail Date Jun. 26, 2007.

Reply to Office Action In Inter Partes Reexamination for U.S. Appl. No. 95/000,243 for U.S. Patent No. 7,100,061, Mail Date Aug. 27, 2007.

Declaration of Marc W. Fleischmann (with Exhibits) in Inter Partes U.S. Appl. No. 95/000,243, for U.S. Patent No. 7,100,061, Signed Aug. 26, 2007 Mail Date Aug. 27, 2007.

Declaration of John O'Hara Horsley (with Exhibits) in Inter Partes U.S. Appl. No. 95/000,243, for U.S. Patent No. 7,100,061, Signed Aug. 27, 2007 Mail Date Aug. 27, 2007.

Decision Granting Petition Under 37 C.F.R. 1.183 for U.S. Appl. No. 95/000,243 for U.S. Patent No. 7,100,061, Mail Date Mar. 19, 2008.

Action Closing Prosecution in Inter Partes U.S. Appl. No. 95/000,243 for U.S. Patent No. 7,100,061, Mail Date Jun. 24, 2008.

Action Closing Prosecution in Inter Partes U.S. Appl. No. 95/000,243 for U.S. Patent No. 7,100,061, Mail Date Jul. 3, 2008.

Reply to Action Closing Prosecution in Inter Partes U.S. Appl. No. 95/000,243 for U.S. Patent No. 7,100,061, Mail Date Sep. 3, 2008.

Declaration of Marc W. Fleischmann (with Exhibits) in Inter Partes U.S. Appl. No. 95/000,243, for U.S. Patent No. 7,100,061, signed Sep. 3, 2008.

Petition Under 37 C.F.R. §1.183 to Waive Page Limit requirement For Response by the Patent Owner Under 37 C.F.R. §1.943(b) in Inter Partes U.S. Appl. No. 95/000,243, for U.S. Patent No. 7,100,061, Mail Date Sep. 3, 2008.

Petition Under 37 C.F.R. §1.181 to Withdraw Action Closing Prosecution in Inter Partes U.S. Appl. No. 95/000,243, for U.S. Patent No. 7,100,061, Mail Date Sep. 3, 2008.

Decision on Petition Filed Under 37 Cfr 1.181 to withdraw action closing prosecution in Inter Partes U.S. Appl. No. 95/000,243, for U.S. Patent No. 7,100,061, Mail Date Dec. 30, 2008.

Right of Appeal Notice (37 CFR 1.953) in Inter Panes U.S. Appl. No. 95/000,243 for U.S. Patent No. 7,100,061, Mail Date Dec. 31, 2008.

\* cited by examiner

ADAPTIVE POWER CONTROL

This patent application is a Continuation of commonly-owned patent application Ser. No. 09/484,516, filed on Jan. 18, 2000 now U.S. Pat. No. 7,100,061, entitled "ADAPTIVE POWER CONTROL", by Halepete et al., which is incorporated herein by reference.

BACKGROUND OF THE INVENTION

1. Field of the Invention

This invention relates to computer systems and, more particularly, to methods for varying the amount of power used by such systems during use of the systems.

2. History of the Prior Art

A significant problem faced by battery powered computers is the length of time such computers are capable of operating between charges. As computer processors become more capable, they tend to run at faster speeds and dissipate more power. At the same time, the size and weight of portable computers is constantly being reduced to make them more portable. Since batteries tend to be a very significant element of the weight of portable computers and other portable devices, the tendency has been to maintain their size and thus their capacity at a minimum.

A typical portable computer today has an average life of approximately two and one-half hours until its originally-full battery must be recharged.

A great deal of research has been directed to ways for extending the operating life of portable computers. Presently, typical processors include circuitry and software for disabling various power-draining functions of portable computers when those functions are unused for some extensive period. For example, various techniques have been devised for turning off the screen when it has not been used for some selected period. Similar processes measure the length of time between use of hard drives and disable rotation after some period. Another of these processes is adapted to put a central processor into a quiescent condition after some period of inactivity.

In general, these processes are useful in extending the operating life of a portable computer. However, the life still does not extend significantly beyond two and one-half hours for any computer having significant capabilities.

There has been a significant amount of research conducted from which processor requiring less power might be produced. Most processors used in computer systems today are made using CMOS technology. The power consumed by a CMOS integrated circuit is given approximately by $P=CV^2f$, where C is the active switching capacitance, V is the supply voltage, and f is the frequency of operation. The maximum allowable frequency is described by $f_{max}=kV$, where k is a constant.

It is desirable to operate the processor at the lowest possible voltage at a frequency that provides the computing power desired by the user at any given moment. For instance, if the processor is operating at 600 MHz, and the user suddenly runs a compute-intensive process half as demanding, the frequency can be dropped by a factor of two. This means that the voltage can also be dropped by a factor of two. Therefore, power consumption is reduced by a factor of eight. Various methods of implementing this dynamic voltage-frequency scaling have been described in the prior art. All of these involve a component separate from the processor on the system that provides multiple frequencies to multiple system components. Also, they involve state-machines or power-management units on the system to coordinate the voltage-frequency changes. The efficiency of voltage frequency scaling is reduced when the frequency generator is not on the processor. Having a separate power-management unit increases the number of components in the system and the power dissipated by the system. It is also desirable to have the processor control both the voltage it receives and the frequency it receives. As the level of integration increases in processors, they control most of the system clocks; and it is desirable to provide control to the processor to change these clocks so they can be run at just the right frequency. Having a separate clock generator that produces multiple frequencies is not desirable because of the lack of tight coupling.

It is desirable to increase significantly the operating life of portable computers and similar devices.

SUMMARY OF THE INVENTION

It is, therefore, an object of the present invention to increase significantly the operating life of portable computers.

This and other objects of the present invention are realized by a method for controlling the power used by a computer including the steps of utilizing control software to measure the operating characteristics of a processor of the computer, determining when the operating characteristics of the central processor are significantly different than required by the operations being conducted, and changing the operating characteristics of the central processor to a level commensurate with the operations being conducted.

These and other objects and features of the invention will be better understood by reference to the detailed description which follows taken together with the drawings in which like elements are referred to by like designations throughout the several views.

DETAILED DESCRIPTION

Figure 1:
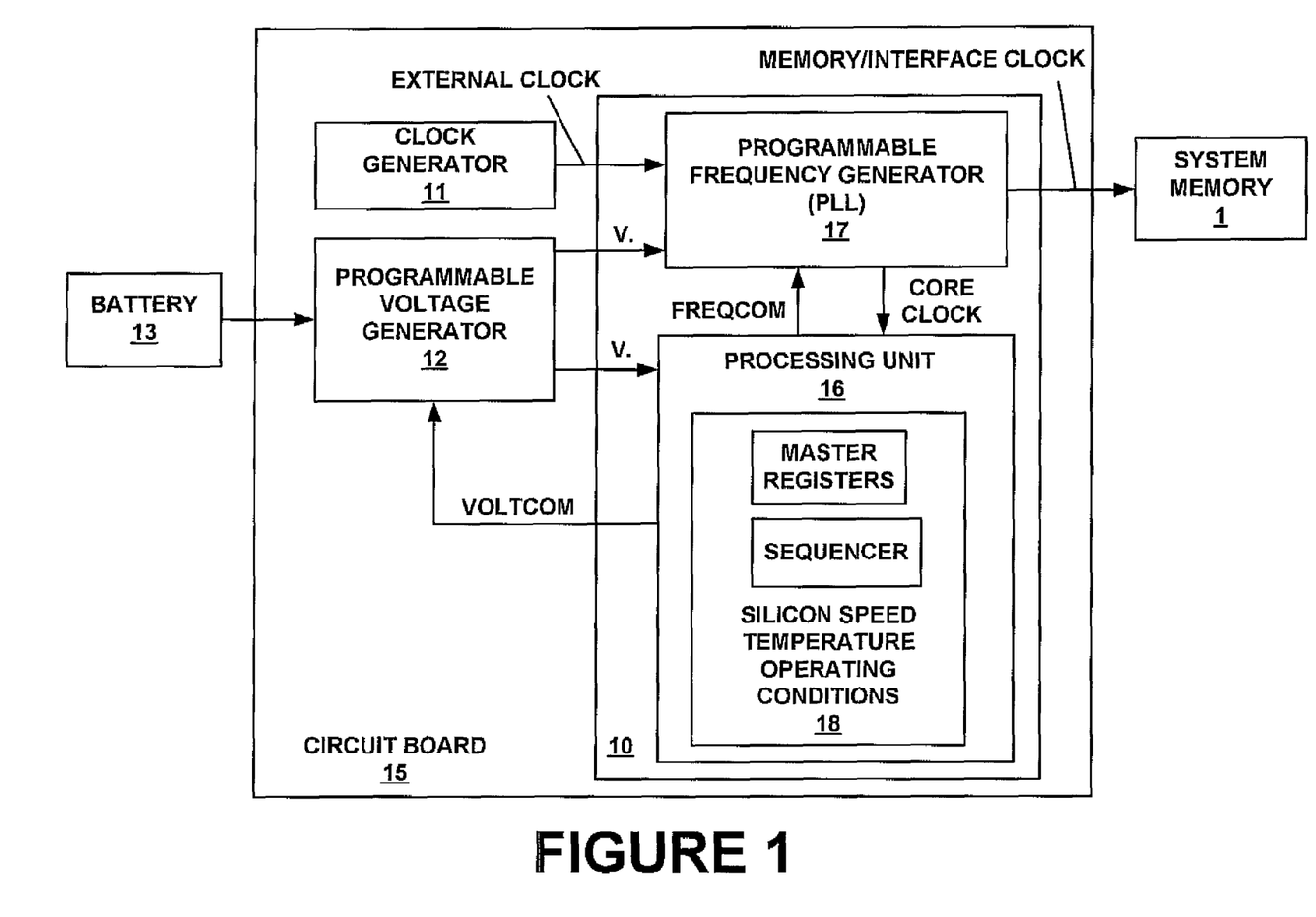
FIG. 1 is a block diagram of various hardware components of a computer system utilized in accordance with the present invention.

FIG. 1 is a block diagram of various hardware components of a computer system utilized in accordance with the present invention to control the operating frequency and voltage of the system. The hardware includes a processor 10, a clock generator 11, a programmable voltage generator 12, system memory (DRAM) 14, and an external battery (or other power supply) 13. The processor 10, clock generator 11, and voltage generator 12 are all mounted to a circuit board 15 in a manner known to those skilled in the art. The battery 13 and system memory 14 may be electrically connected to the circuit board in a number of possible ways known to those skilled in the art.

The processor 10 includes on the same semiconductor chip a number of components including a processing unit 16 and a programmable frequency generator 17. The processor 10 also typically includes a number of other components which are known to those skilled in the art but are not pertinent to the present invention and are therefore not illustrated. The processing unit 16 includes a number of logical components including a master control unit 18 which is the central portion for accomplishing clock and voltage control. In the present invention, the master control unit 18 also includes circuitry for monitoring the operating characteristics of the processor. Various monitoring functions (such as circuitry for accomplishing voltage and frequency monitoring) which are well known to the prior art are included as a part of the logical master control unit 18. The logical unit 18 may also include circuitry for making available additional information detected by other portions of the computer system in either analogue or digital form (e.g., temperature data). The logical unit 18 also includes circuitry for detecting other operations of the system including commands to be executed from which a particular type of operation to be executed may be determined. A detailed discussion of circuitry for providing various operating characteristics is included in U.S. patent application Ser. No. 09/417,930, entitled Programmable Event Counter System, B. Coon et al, filed Oct. 13, 1999, and assigned to the assignee of the present application.

The programmable frequency generator 17 receives an external frequency often referred to as a "slow clock" from the external clock generator 11. The generator 17 responds to values furnished by control software executing on the processor to produce from the slow clock a core clock for operation of the processing unit 16, one or more clocks for operation of the various system memory components shown as system memory 14 in the figure, the system bus, and any other components which might utilized a separate clock.

It should be specifically noted that contrasted to prior art systems, the programmable frequency generator is able to provide individual frequencies selectable for each of these components. Thus, prior art arrangements utilize an external clock generator to provide all of the different frequencies utilized by the system. This has a number of effects which are less than desirable. Since the clocks are generated off-chip, the time needed to change frequency is long. Since in an integrated processor all clocks are created from a single slow clock off chip, if the core frequency changes all of the frequencies change with it. Thus, a frequency furnished a single component cannot be changed without affecting a change in other frequencies. The voltage furnished by the external clock generator does not change even though reduced frequencies adapted to provide reduced levels of operations are furnished for various components of the system. A number of other factors slow the response of the system to changes in the various clocks when an external clock is used to generate the various operating frequencies for a system.

The core frequency for the processing unit 16 is generated by multiplying the slow clock by a factor. This factor is computed by the control software of the present invention which monitors the operation of the processor to determine from the characteristics of the processor just what frequency should be selected. The manner in which the monitoring is accomplished and the effect it has on the control of the operating characteristics is described in detail below.

The frequencies at which the other components of the system operate are determined from the core frequency determined by multiplying the slow clock by the core processor factor. For example, a system input/output (I/O) bus typically functions at a much slower frequency than does the processing unit. In the present invention, the control software computes the bus frequency by dividing the core frequency by a value. The process may also be conducted as a table lookup of an already computed value. If the processing unit is conducting its current operations at a normal speed of 400 MHz, a bus frequency of 100 MHz. is derived by dividing the core clock by four. On the other hand, if the processing unit is capable of accomplishing its current operations at a relatively slow speed of 200 MHz, a bus frequency of 100 MHz. is still desirable since bus operations are often the limiting factor in processing operations. In such a case, the control software computes a value of two as the divisor to obtain the bus frequency. It should be noted that although the bus frequency under discussion has been the system I/O bus, the invention may also be used for precisely choosing the operating frequencies for other system buses.

Similarly, various processors are often capable of utilizing system memory having different characteristics one of which is switching speed.

A system may utilize a plurality of interfaces between the processing unit and system memory in order to provide different operating frequencies for system memory which is being utilized. The present invention allows this to be easily accomplished by utilizing different divisors to obtain different values from which the operating frequencies for different system memory units are determined. As will be noted in the following discussion, two different memory frequencies as utilized and more are possible.

Thus, by utilizing the phase-lock-loop generator 17 to determine a core clock frequency and dividing that frequency by a plurality of different values determined by the control software, the operating frequencies for the different components of the system may be individually controlled and furnished to other components of the processor without the necessity of crossing chip boundaries with the consequent slowing caused by negotiating the boundaries.

Figure 3:
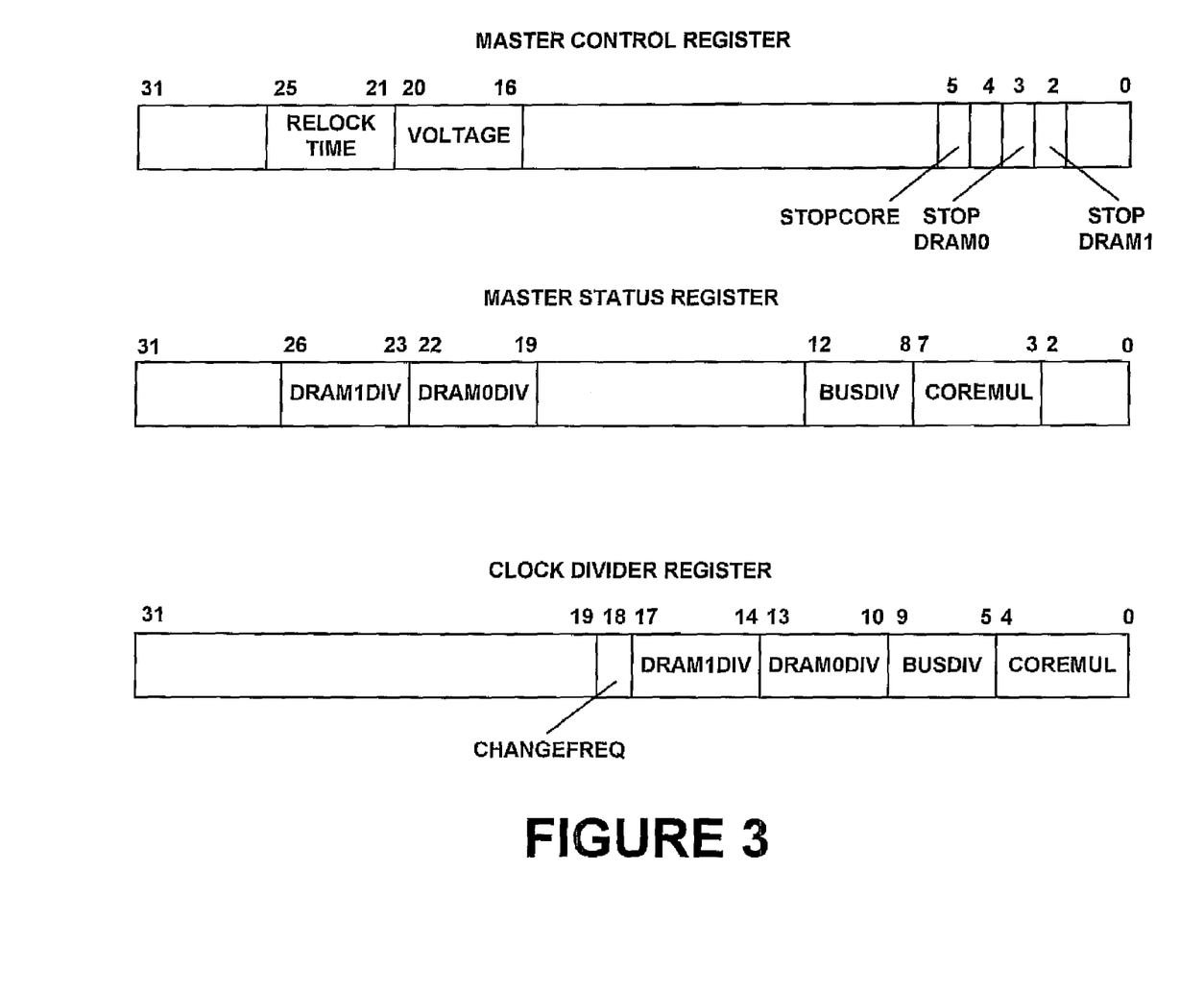
FIG. 3 illustrates a number of registers utilized in the hardware components of the system shown in FIG. 1.

In order to allow the master control unit 18 to accomplish these operations, the processing unit 16 includes a number of registers which are utilized by the control software and the hardware. These include a master control register 20, a master status register 21, and a master clock divider register 22 which are illustrated in FIG. 3.

Of these registers, the clock divider register 22 stores, among other things, the multiplier computed by the control software for generating the core frequency, the value used as a divisor to obtain the bus frequency from the core frequency, a value used as a divisor to obtain a first system memory frequency from the core frequency, and a value used as a divisor to obtain a second system memory frequency from the core frequency. In addition, the clock divider register 22 stores values used for various other including an indication that a frequency change command has been received.

The master control register includes values pertinent to the present description including the voltage which is to be furnished to the processor as a part of the change of frequency. This register also stores a value indicating the time period allowed for accomplishing the phase-lock-loop relock operation. The master status register also stores the various values used as dividers and the value used as a multiplier to obtain the core frequency along with other significant information.

The various values stored in these registers are utilized, among other things, to control the operations of sequencer circuitry (illustrated in FIG. 4) which carries out the operations necessary to changing the frequency at which the components of the system operate. The sequencer circuitry carries out the series of steps required by which the phase-lock-loop circuitry is brought to the new frequency and relocked after the processor clock has been shut off.

Figure 4:
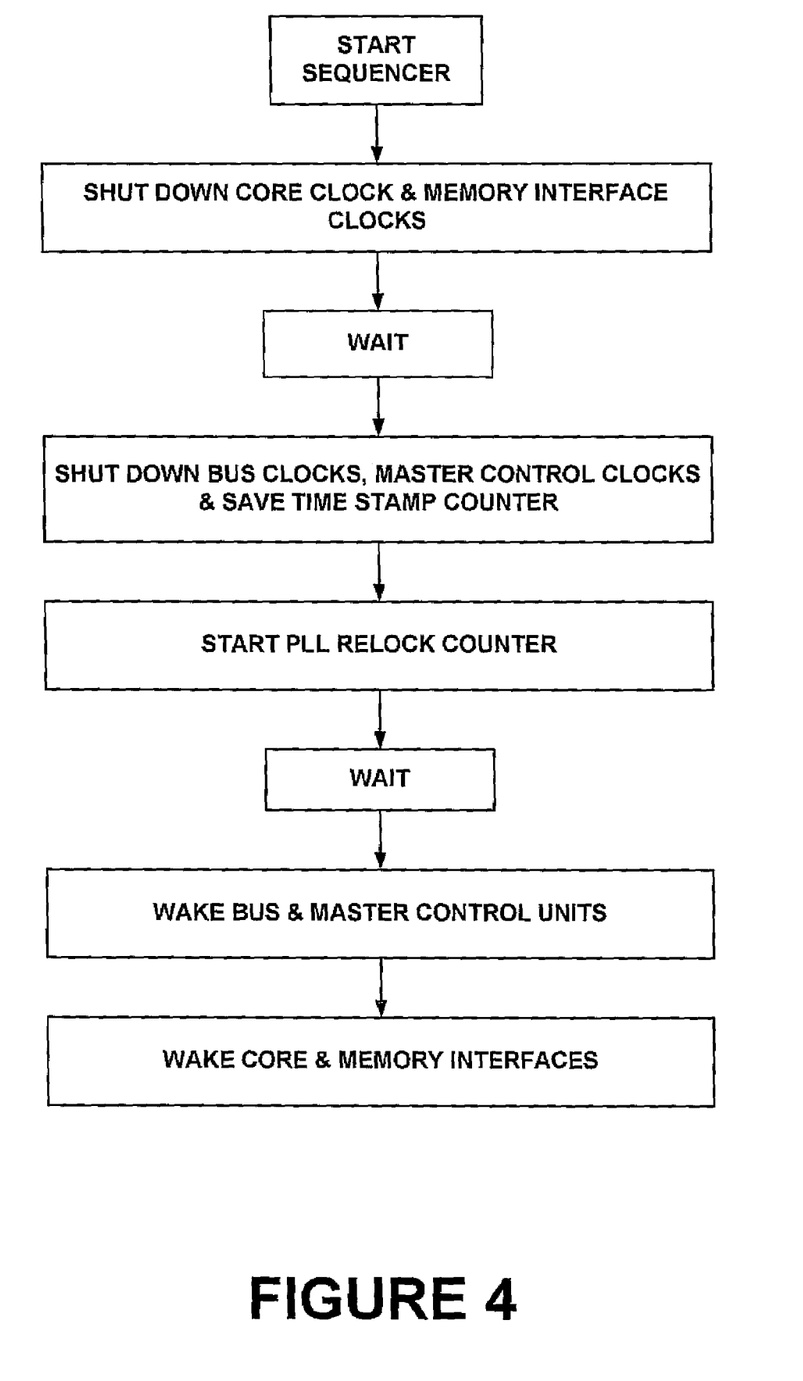
FIG. 4 is a block diagram illustrating the operation of sequencer circuitry which is a part of a processor illustrated in the system of FIG. 1.

The operations carried out by the sequencer commence at an idle state which represents the normal condition of the sequencer in the absence of a frequency change operation. When the change frequency command and values are received, the sequencer steps from the idle condition to first shut down the core clock and the clocks to the various memory interfaces. The sequencer then waits a few cycles before shutting down the bus clock, the master control clock, and saving information sufficient to assure that timing during and after the sequencing is correct. After this delay, the sequencer starts a counter to time the phase-lock-loop relock process. When this count is complete, the sequencer wakes the bus and the master control units. Finally, the sequencer wakes up the core and memory interfaces and awaits another frequency changing operation. The relation of the sequencer to the control software will be described in detail in the discussion of the process of the control software which follows.

Figure 2:
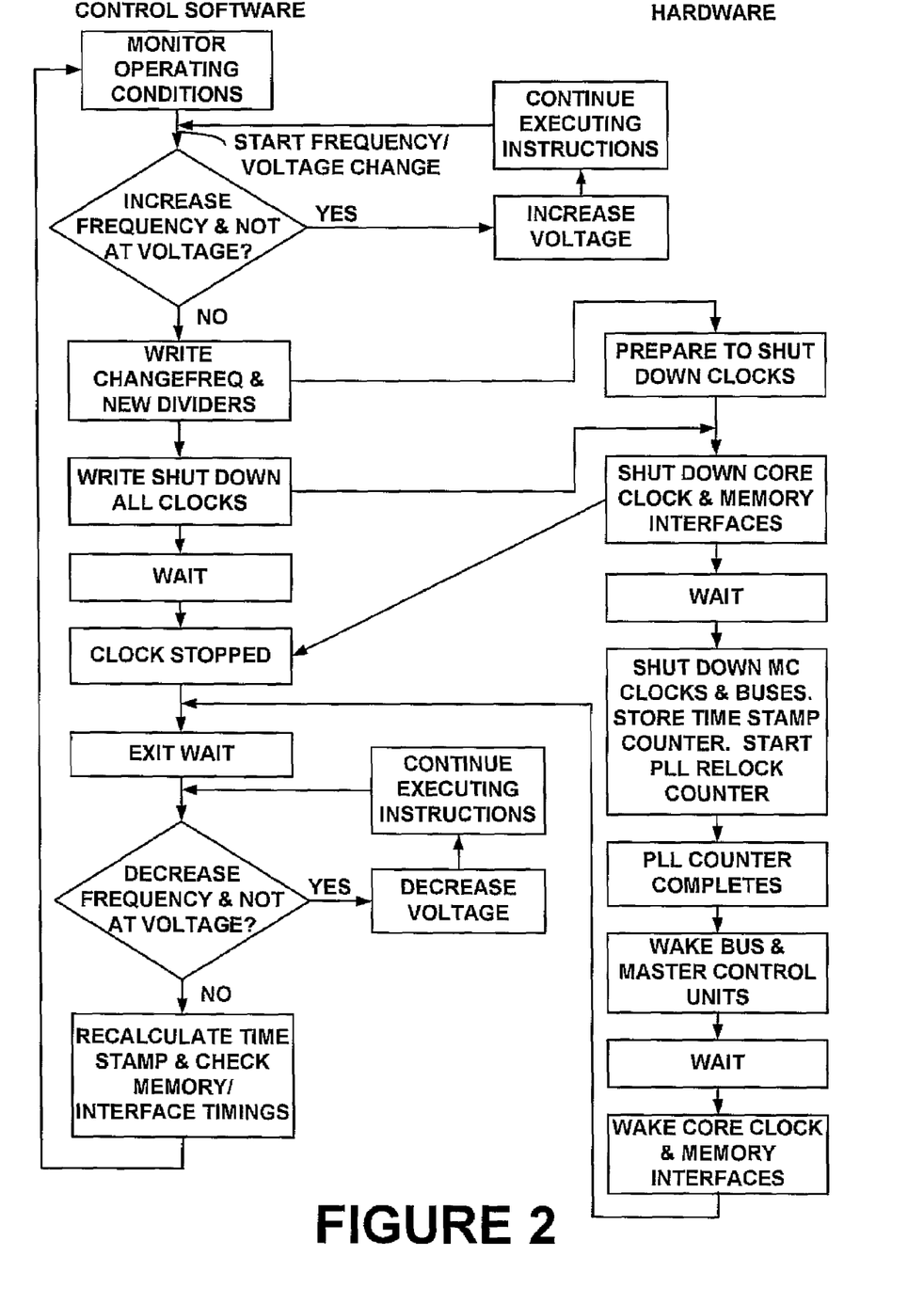
FIG. 2 is a flow chart illustrating the operation of one embodiment of the invention.

FIG. 2 is a flow chart representing the process carried out by one embodiment of the invention. In the figure, the steps described in the left column represent operations accomplished by the control software, while the steps described in the right column represent operations accomplished by the cooperating hardware.

In a first step, the control software monitors various conditions of the processor which relate to power expenditure by the processor. These conditions may include any of those described above including the present frequency and voltage of operation, the temperature of operation, the amount of time the processor spends in one of what may be a number of idle states in which various components of the system are quiescent. For example, if the processor is running in what might be termed its normal mode of operation at a core frequency of 400 MHz. and a voltage of 1.3 volts, the control software may be monitoring the amount of time the processor spends in the "halt" state, the amount of time the processor spends in the "deep sleep" state, and the temperature of the processor. The deep sleep state is a state in which power is furnished only to the processor and to DRAM memory. In this state, the processor are all off and it does not respond to any interrupts. The halt state is a state in which the core clock has been stopped but the processor responds to most interrupts. If the processor is spending more than a preselected increment of its operation in these states while operating at normal frequency and voltage, then power is being wasted. The detection of such operating characteristics therefore may indicate that the frequency and voltage of operation should be reduced.

On the other hand, it may be found that the processor is functioning at a reduced frequency and voltage and that a series commands have been furnished to be executed by the processor which require greater processing power. In such a case, these characteristics suggest that it may be desirable to increase the voltage and frequency of operation in order to handle these commands.

Consequently, the control software detects operating characteristics and determines whether those characteristics indicate that the frequency and voltage of operation should be changed. From the possible sets of conditions, the control software detects the particular set involved and computes correct values for the core clock frequency, the core clock frequency multiplier, the various DRAM clock frequency dividers, and the bus frequency divider. If any other components of the circuitry receive their own clocks, then multipliers or dividers for these values are computed. It should be noted that the control software may actually compute the various values required for the given characteristics which have been determined or may utilize a lookup table storing precomputed values.

At a next step, the software reviews the values computed and determines whether the frequency is to be increased. If the frequency is to be increased, it is first necessary that the voltage be increased to allow the processor to function at a higher frequency. In such a case, it is first necessary to increase the voltage level of operation. The typical power supplies offer a number of pins (often five) by which different operating voltages may be selected. This allows a range of different voltages to be provided. Consequently, the control software simply furnishes a correct value on the input pins of the power supply to cause the computed voltage to be furnished to the frequency generator and to the processor.

In one embodiment, the voltage increase is accomplished by providing a level to be reached and a time period for the voltage to settle to this level. It should be noted that the voltage may be increased in a single step, an action which would typically cause phase-locked-loop circuitry of a frequency generator to lose its lock and would create a large surge of current causing the currently-available voltage regulator circuitry to initiate a system reset. This problem may be eliminated with future voltage regulator circuitry. Alternatively, the voltage may be increased in a series of small steps which would not have this effect. For example, if increases of approximately 50 millivolts are enabled, then the frequency generator will remain stable during the voltage increase and a system reset will not occur. This offers the advantage that the processor may continue to execute commands during the period in which the voltage change is taking place.

If the control software was not increasing but rather decreasing frequency of operation at the previous step, then the original voltage level is not changed at this time. In either case, the control software then goes through a sequence of steps in which various operations of the processor are prepared for shutdown so that the system clocks can be changed. With a particular processor such as that referred to in the patent application described above, this includes flushing a gated store buffer, suspending bus and direct memory access (DMA) operations, and enabling self-refreshing circuitry for system DRAM memory.

With these processor operations shut down, the control software transfers the new divider values and writes a bit indicating a frequency change is to occur. The hardware stores the divider values in the clock divider register and the change frequency indicator. This starts the hardware process of the sequencer. The control software then writes "stop core," "stop DRAM0" and "stop DRAM1" bits of the master command register to stop the clocks being furnished to these components.

Writing the master control register bits to stop the clock frequencies and the values to the hardware causes the hardware to commence the remainder of the frequency changing operation utilizing the sequencer circuitry described above. At this point, the software effectively goes into a wait state which continues until the core clock is enabled at the new frequency. The sequencer responds to the command by shutting down the core clock and the DRAM memory interfaces. The sequencer pauses for sufficient time to assure that this has happened and then shuts down the bus and master control clocks.

Because the core clock has been stopped, timing must be accomplished based on the external clock furnished to the system during this period. Counter circuitry dependent only on phase-lock-loop relock time is utilized to measure the time allowed for the phase-lock-loop circuitry to lock to the new frequency. At this point, the sequencer utilizes the new values furnished to effect a new value for the core (and other) frequency. After a safe lock period has passed ("relock time" stored in the master control register), the sequencer wakes the bus and master control units. The sequencer waits a few clocks of the slow frequency and then turns on the core clock and the DRAM interfaces.

Because the internal clocks of the system are shut down during the operation of the sequencer, it is necessary that the system provide a means of maintaining timing consistent with the normal world clock. Computer systems utilize a time stamp counter to keep track of world clock values. The value kept in this counter is utilized for certain operations conducted by the central processing unit. Once the phase-lock-loop circuitry of the frequency generator 17 has been stopped, the value in the time clock counter no longer represents accurate world time. Moreover, when the new frequency is reached and locks in, the rate at which the counter is iterated will change. To provide for accurate time stamp readings, a number of lower-valued bits indicating the last time of program execution held by the time stamp counter are stored. These are furnished to the control software along with the relock time value and the new frequency once the frequencies have restabilized to allow accurate computation of the normal world time.

Once the clocks have been turned on at the new frequencies, the control software ends its wait state and determines whether the operation was to decrease the frequency. Assuming the operation was to increase the frequency, the software then recalculates the time stamp counter value and checks the various interface timings to assure that they are correct. If the operation was to decrease the frequency, the control software causes the voltage to be lowered to the calculated value (either in one or a series of incremental steps) and then recalculates the value for the time stamp counter and checks the interface timings. At that point, the control software begins again to monitor the various conditions controlling the frequency and voltage of operation.

It should be noted that at some point during the monitoring operation it may be found that the processor is functioning at a normal frequency and voltage, that the temperature of operation is below some preselected value, and that a series of processor-intensive commands have been furnished to be executed by the processor. In such a case, these characteristics suggest that it may be desirable to increase the voltage and frequency of operation in order to handle these commands for a period less than would raise operating temperatures beyond a safe level. In such a case, the control software may compute higher frequency and voltage values and a temperature (or a time within which temperature will not increase beyond a selected level) in order to cause the hardware to move to this higher frequency state of operation. In such a case, the processor executing the process illustrated effectively ramps up the frequency and voltage so that the processor "sprints" for a short time to accomplish the desired operations. This has the effect of allowing a processor which nominally runs at a lower frequency to attain operational rates reached by more powerful processors during those times when such rates are advantageous.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A method of adjusting power of a processor, said method comprising:
    (a) changing an operating frequency at which said processor is operated from a first frequency to a second frequency while execution of instructions by said processor is stopped;
    (b) changing a voltage at which said processor is operated from a first voltage corresponding to said first frequency to a second voltage corresponding to said second frequency while said processor executes instructions where said processor is not capable of functioning at said first frequency and said second voltage.

2. The method as recited in claim 1 further comprising:
   monitoring an operating characteristic of said processor; and
   determining whether said first voltage should be changed based at least in part on said operating characteristic.

3. The method as recited in claim 1 further comprising:
   monitoring operating characteristics of said processor;
   determining whether said monitored operating characteristics indicate that the operating frequency of said processor should be changed; and
   if said operating frequency of said processor should be changed, determining said second frequency and said second voltage.

4. The method as recited in claim 1 wherein said processor receives battery-supplied power.

5. The method as recited in claim 1 wherein said processor includes a phase lock loop and said changing said operating frequency further comprises:
   waiting for a period of time sufficient to allow said phase lock loop to relock.

6. The method as recited in claim 1 wherein said processor includes a clock and said changing said operating frequency further comprises:
   shutting down said clock.

7. A computer comprising:
   a memory comprising instructions stored therein; and
   a processor adapted to adjust consumption of power by changing a frequency of operation of the processor from a first frequency to a second frequency while execution of instructions is stopped, and changing a voltage from a first voltage corresponding to said first frequency to a second voltage corresponding to said second frequency at which said processor is operated while allowing said processor to execute instructions and where said processor can not function at said first frequency and said second voltage.

8. The computer as recited in claim 7, wherein said processor monitors one or more operating characteristics of said processor, and wherein said processor determines whether one or more of said monitored operating characteristics indicate that said voltage should be changed.

9. The computer as recited in claim 7 wherein said processor monitors operating characteristics of said processor, wherein said processor determines whether said monitored operating characteristics indicate that said frequency of operation of said processor should be changed, and wherein said processor determines said second voltage if said frequency of operation of said processor should be changed.

10. The computer as recited in claim 7 wherein said power comprises battery-supplied power.

11. The computer as recited in claim 7 further comprising:
    a phase lock loop integrated into said processor.

12. The computer as recited in claim 7 wherein said processor includes a phase lock loop and said changing the frequency of operation further comprises:
    waititn for a period of time sufficient to allow said phase lock loop to relock.

13. The computer as recited in claim 7 wherein said processor includes a clock and said changing the frequency of operation further comprises:
    shutting down said clock.

14. An apparatus comprising:
a programmable frequency generator providing a clock signal with an operating frequency at a first frequency;
means for executing instructions, said means coupled to said clock signal and operating with a first voltage corresponding to said first frequency;
means for causing adjustment in consumption of power by said apparatus, by (a) causing said programmable frequency generator to change said operating frequency to a second frequency while execution of said instructions is stopped; and (b) changing said first voltage to a second voltage corresponding to said second frequency while said means for executing instruction executes instructions where said means for executing instructions can not function at said first frequency and said second voltage.

15. The apparatus as recited in claim 14 wherein said means for causing adjustment monitors operating characteristics of said apparatus, and wherein said means for causing adjustment determines whether said monitored operating characteristics indicate that said first voltage should be changed.

16. The apparatus as recited in claim 14 wherein said means for causing adjustment monitors operating characteristics of said apparatus, wherein said means for causing adjustment determines whether said monitored operating characteristics indicate that said operating frequency of said apparatus should be changed from said first operating frequency, and wherein said means for causing adjustment determines said second voltage if said operating frequency of said apparatus should be changed.

17. The apparatus as recited in claim 14 wherein said power comprises battery-supplied power.

18. The apparatus as recited in claim 14 wherein said programmable frequency generator includes a phase lock loop and said causing comprises said means for executing instructions waiting for a period of time sufficient to allow said phase lock loop to relock.

19. The apparatus as recited in claim 14 wherein said causing adjustment comprises shutting down said clock to said means for executing instructions.

20. A method for adjusting power consumption in a processor hang a processing unit that operates at (a) a frequency responsive to a clock signal provided by a programmable frequency generator and (b) an operating voltage, said method comprising:
(i) adjusting said programmable frequency generator while instruction execution is stopped to change the frequency of said processing unit from a first frequency to a second frequency; and
(ii) changing the operating voltage of said processing unit from a first voltage corresponding to said first frequency to a second voltage corresponding to said second frequency while execution of instructions by said processing unit proceeds where said processor can not function at said first frequency and said second voltage.

21. The method of claim 20 wherein said programmable frequency generator includes a phase lock loop, and said adjusting further comprises:
waiting for a period of time sufficient to allow said phase lock loop to relock.

22. The method of claim 20 wherein said adjusting said programmable frequency generator comprises stopping said clock signal.

23. A method for adjusting power consumption in a processor having a processing unit that operates at (a) a frequency responsive to a clock signal provided by a programmable frequency generator and (b) an operating voltage, said method comprising:
(i) stopping execution of instructions in said processing unit;
(ii) while instruction execution is stopped, adjusting said programmable frequency generator to change the frequency of said processing unit from a first frequency to a second frequency; and
(iii) changing the operating voltage while allowing the processing unit to execute instructions from a first voltage corresponding to said first frequency to a second voltage corresponding to said second frequency where said processing unit can not function at said first frequency and said second voltage.

24. The method of claim 23 wherein said programmable frequency generator comprises a phase lock loop and said stopping further comprises:
waiting for a period of time sufficient to allow said phase lock loop to relock.

25. The method of claim 23 wherein said stopping comprises stopping said clock signal.

26. A method for adjusting power consumption in a processor inctuding a processing unit that operates at (a) a frequency responsive to a clock signal provided by a programmable frequency generator and (b) an operating voltage, said method comprising:
(i) changing the operating voltage from a first voltage to a second voltage while the processing unit is enabled to execute instructions;
(ii) disabling execution of instructions by said processing unit; and
(iii) while instruction execution is disabled, adjusting said programmable frequency generator to change the frequency of said processing unit from a first frequency corresponding to said first voltage to a second frequency corresponding to said second voltage where said processing unit can not function at said second frequency and said first voltage.

27. The method of claim 26, wherein said processing unit has a nominal operating frequency and a corresponding operating voltage, said method further comprising:
said changing comprising setting said second voltage to a value higher than said corresponding operating voltage; and
said adjusting comprising setting said second frequency of said processing unit to a value higher than said nominal operating frequency.

28. The method of claim 27, further comprising:
operating the processing unit at said second voltage and said second frequency for a period of time.

29. The method of claim 28 wherein the period comprises a time less than required for a temperature to increase beyond a selected level.

30. The method of claim 29 wherein said selected level comprises a safe level.

31. The method of claim 27 further comprising:
operating at said second voltage and said second frequency while a temperature remains at or below a selected level.

32. The method of claim 31 wherein said selected level comprises a safe level.

33. A processor comprising:
a processing unit for executing instructions, said processing unit operating at a first operating voltage and at a corresponding first frequency of operation, wherein:
said processor monitors one or more operating characteristics of said processor and determines whether said monitored operating characteristics indicate that consumption of power by said processor should be decreased, and said processor, in response to a determination to decrease the consumption of power, changes the first frequency of operation of the processing unit to a second frequency of operation while execution of instructions by the processing unit is stopped, and changes the first operating voltage to a second operating voltage corresponding to said second frequency of operation while said processing unit executes instructions where said processing unit can not function at said first frequency of operation and said second operating voltage.

34. The processor of claim 33, wherein said processor monitors a thermal condition operating characteristic and adjusts the consumption of power based at least in part on said thermal condition.

35. The processor of claim 33 wherein at least some of the instructions are utilized by said processor to monitor one or more of said operating characteristics.

36. A processor comprising:
a processing unit for executing instructions, said processing unit operating at an operating voltage and at a frequency of operation, wherein said processor, in response to a determination to decrease the consumption of power,
(i) changes the frequency of operation of the processing unit from a first frequency to a second frequency while execution of instructions by the processing unit is stopped, and
(ii) changes the voltage at which said processing unit is operated from a first voltage corresponding to said first frequency to a second voltage corresponding to said second frequency while said processing unit executes instructions where said processing unit can not function at said first frequency and said second voltage.

37. The processor of claim 36 wherein said processor monitors a thermal condition of said processor, and adjusts the consumption of power based at least in part on said thermal condition.

38. The processor of claim 36 wherein said processor monitors operating characteristics of said processor utilizing at least some of the instructions.

39. A processor having a nominal operating frequency and a corresponding operating voltage, said processor comprising:
a processing unit capable of executing instructions, said processing unit operating at an operating voltage and at a frequency of operation, wherein said processor, in response to a determination to adjust said frequency of operation,
(i) changes the voltage at which said processing unit is operated to a value greater than said corresponding operating voltage while said processing unit executes instructions, and
(ii) changes the frequency of operation of the processing unit to a frequency value greater than said nominal operating frequency while execution of instructions by the processing unit is stopped.

40. The processor of claim 39, wherein said processing unit operates at said increased voltage and frequency for a period of time.

41. The processor of claim 40 wherein said processor monitors a temperature and the period comprises a time less than required for said temperature to increase beyond a selected level.

42. The processor of claim 41 wherein said selected level comprises a safe level.

43. The processor of claim 39 wherein said processor monitors a temperature of said processor and said processing unit operates at said voltage value and said frequency value while said temperature remains at or below a selected level.

44. The processor of claim 43 wherein said selected level comprises a safe level.

45. The processor of claim 39 wherein said processor can not function at the frequency of operation greater than said nominal operating frequency and said corresponding operating voltage.

46. The processor of claim 45, wherein said processing unit operates at said increased voltage and frequency for a period of time.

47. The processor of claim 46 wherein said processor monitors a temperature and the period comprises a time less than required for said temperature to increase beyond a selected level.

48. The processor of claim 47 wherein said selected level comprises a safe level.

49. The processor of claim 45 wherein said processor monitors a temperature of said processor and said processing unit operates at said voltage value and said frequency value while said temperature remains at or below a selected level.

50. The processor of claim 49 wherein said selected level comprises a safe level.

51. A method of adjusting power of a processor, said method comprising:
(i) changing a voltage at which said processor is operated from a first voltage to a second voltage while said processor executes instructions; and
(ii) changing an operating frequency at which said processor is operated from a first frequency corresponding to said first voltage to a second frequency corresponding to said second voltage while execution of instructions by said processor is stopped where said processor is not capable of functioning at said second frequency and said first voltage.

52. The method as recited in claim 51 further comprising:
monitoring an operating characteristic of said processor; and
determining whether said first frequency should be changed based at least in part on said operating characteristic.

53. The method as recited in claim 51 further comprising:
monitoring operating characteristics of said processor;
determining whether said monitored operating characteristics indicate that the operating frequency of said processor should be changed; and
if said operating frequency of said processor should be changed, determining said second frequency and said second voltage.

54. The method as recited in claim 51 wherein said first frequency is the nominal operating frequency of the processor.

55. A processor comprising:
a processing unit for executing instructions, said processing unit operating at a first operating voltage and at a corresponding first frequency of operation, wherein:
said processor monitors one or more operating characteristics of said processor and determines whether said monitored operating characteristics indicate that performance of said processor should be increased, and
said processor, in response to a determination to increase the performance, changes the first operating voltage to a second operating voltage while said processing unit executes instructions, and changes the first frequency of operation of the processing unit to a second frequency of operation corresponding to said second operating voltage while execution of instructions by the processing unit is stopped where said processing unit can not function at said second frequency of operation and said first operating voltage.

56. The processor of claim 55, wherein said processor monitors a thermal condition operating characteristic and adjusts the consumption of power based at least in part on said thermal condition.

57. The processor of claim 55 wherein at least some of the instructions are utilized by said processor to monitor one or more of said operating characteristics.

58. The processor of claim 55 wherein the first operating frequency is the nominal operating frequency of the processor.

59. A processor comprising:
  a processing unit for executing instructions, said processing unit operating at an operating voltage and at a frequency of operation, wherein said processor, in response to a determination to increase performance,
  (i) changes the voltage at which said processing unit is operated from a first voltage to a second voltage while said processing unit executes instructions; and
  (i) changes the frequency of operation of the processing unit from a first frequency corresponding to said first voltage to a second frequency corresponding to said second voltage while execution of instructions by the processing unit is stopped and where said processing unit can not function at said second frequency and said first voltage.

60. The processor of claim 59 wherein said processor monitors a thermal condition of said processor, and adjusts the consumption of power based at least in part on said thermal condition.

61. The processor of claim 59 wherein said processor monitors operating characteristics of said processor utilizing at least some of the instructions.

62. The processor of claim 59 wherein said first frequency is the nominal frequency of operation of the processor.

* * * * *